No. 686,793. Patented Nov. 19, 1901.
G. W. WILLIAMS.
STOVE DAMPER.
(Application filed Mar. 30, 1901.)
(No Model.)

Witnesses,
John R. Sherwood.
S. Mahlon Ungle.

Inventor,
Griffith W. Williams.
By Joseph A. Minturn,
Attorney.

UNITED STATES PATENT OFFICE.

GRIFFITH W. WILLIAMS, OF INDIANAPOLIS, INDIANA.

STOVE-DAMPER.

SPECIFICATION forming part of Letters Patent No. 686,793, dated November 19, 1901.

Application filed March 30, 1901. Serial No. 53,717. (No model.)

*To all whom it may concern:*

Be it known that I, GRIFFITH W. WILLIAMS, a citizen of the United States, residing at Indianapolis, in the county of Marion and State of Indiana, have invented certain new and useful Improvements in Stove-Dampers, of which the following is a specification.

The object of my invention is to provide a damper to be used in repairing broken or worn-out dampers in cooking and other stoves which shall be easily and readily placed in the stove without taking the stove apart and which shall be adjustable to stoves of different sizes and of different makes or patterns requiring handles of different lengths.

The object is to provide a rod or handle with round or cylindrical sides to permit of easy rotation in its bearings in the stove and to provide a close-fitting joint between the blade and handle of the damper in order to shut off any leakage of air between the handle and blade.

I accomplish the objects of the invention by the mechanism illustrated in the accompanying drawings, in which—

Figure 1:
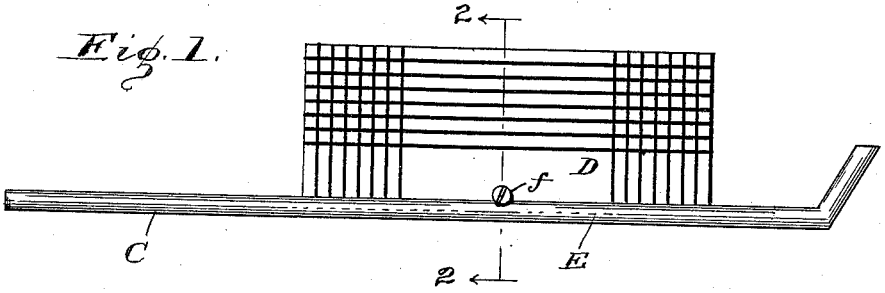
Figure 2:
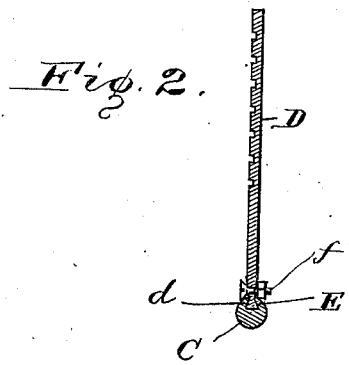

Figure 1 represents a side elevation of my invention with handle in position, and Fig. 2 a cross-section of Fig. 1 through the line 2 2.

Like letters of reference indicate like parts throughout both views of the drawings.

C is the rod to which the blade of the damper is removably secured. This rod is round in cross-section and has one end bent at an obtuse angle to form a convenient handle for operating the same. Formed longitudinally of the rod and preferably on that side of it toward which the bend forming the handle is made is the inwardly-expanding groove E. The blade D of the damper is provided on its lower edge with the dovetail $d$, which takes into the groove E of the rod C, making a close fit therein. The dovetailed edge of the blade is introduced by slipping it into the groove from the open end of the latter, which is the end opposite the bend forming the handle.

By the construction above described a perfectly-tight joint is formed between the blade and rod and no fastening-lugs to project out from the rod and hold the latter away from the oven-plate to permit air to pass under the rod are used. The round rod lies close against the oven-plate in all positions of the damper—a very important feature of my invention. As the wedge-shaped groove E runs nearly the entire length of the rod C, I am enabled to set the blade D at any position along the handle to suit stoves requiring handles of varied lengths, and in order to set and hold the blade in any position on the rod I pass the bolt $f$ through the blade D in such close relation to the rod C that the head of the bolt and the nut thereon contact with the rod and impinge thereon.

Having thus fully described my invention, what I claim as new, and wish to secure by Letters Patent of the United States, is—

A stove-damper comprising a round rod having a single inwardly-expanding groove extending from one end of the rod longitudinally nearly its entire length, a blade having V-shaped grooves on each side near one edge forming a dovetailed edge, said edge taking into the groove of the rod by being inserted from one end of the groove and making a close sliding fit therein, whereby the blade is adjustable on the rod, and a screw for confining the blade to its adjusted position on the rod, substantially as described.

In witness whereof I have hereunto set my hand and seal, at Indianapolis, Indiana, this 12th day of March, A. D. 1901.

GRIFFITH W. WILLIAMS. [L. S.]

Witnesses:
JOHN B. SHERWOOD,
JOS. A. MINTURN.